United States Patent
Bradfield et al.

(10) Patent No.: US 6,536,999 B1
(45) Date of Patent: Mar. 25, 2003

(54) GEAR CUTTER BLADE

(75) Inventors: Joseph Bradfield, Columbia City, IN (US); Robert Sullivan, Fort Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/949,751

(22) Filed: Sep. 12, 2001

(51) Int. Cl.[7] .............. B23F 1/06; B23F 21/22
(52) U.S. Cl. .............. 409/26; 409/12; 409/51; 407/21; 407/22
(58) Field of Search ............... 407/23, 21, 22, 407/25, 28–29, 20, 113; 409/12, 11, 26, 51, 25, 27–30

(56) References Cited

U.S. PATENT DOCUMENTS

| | | | |
|---|---|---|---|
| 1,759,333 A | * 5/1930 | Wildhaber | 451/47 |
| 3,715,789 A | * 2/1973 | Johnson | 407/26 |
| 3,915,060 A | * 10/1975 | Koga | 409/53 |
| 4,278,370 A | 7/1981 | Spear | |
| 4,530,623 A | 7/1985 | Kotthaus | |
| 4,575,286 A | 3/1986 | Blakesley | |
| 4,621,954 A | 11/1986 | Kitchen et al. | |
| 5,033,239 A | 7/1991 | Phillips | |
| 5,123,786 A | * 6/1992 | Yates et al. | 407/38 |
| 5,374,142 A | 12/1994 | Masseth | |
| 5,934,841 A | * 8/1999 | Rutschke et al. | 407/22 |
| 6,146,253 A | 11/2000 | Litvin et al. | |

* cited by examiner

*Primary Examiner*—A. L. Wellington
*Assistant Examiner*—Erica E Cadugan
(74) *Attorney, Agent, or Firm*—Liniak, Berenato & White

(57) ABSTRACT

A cutter blade for use with a face hob type cutter for producing the teeth of spiral bevel and hypoid gear members by a continuous index, face hobbing process comprises a cutter blade shank having a cutting member provided at one end thereof. The cutting member includes a tooth side cutting edge having a given axial pressure angle, and a tooth topland cutting edge. The tooth topland cutting edge of the cutting member simultaneously forms a topland surface of the tooth of the gear member as the tooth is cut by the tooth side cutting edge of the cutting member.

8 Claims, 2 Drawing Sheets

GEAR CUTTER BLADE

BACKGROUND OF THE INVENTION

1. Field of the Invention

The invention relates to cutter blades for the production of gears and, more particularly, to cutter blades for the face hobbing of parallel depth spiral bevel and hypoid gears.

2. Description of the Prior Art

Spiral bevel and hypoid gear pairs are conventionally produced utilizing either an intermittent index face milling method or a continuous indexing face hobbing method. While most gear set manufacturers currently use the face milling method, the face hobbing process has been recently adopted by some manufacturers, especially those manufacturing such gear sets for vehicular applications. In a face hobbing machine, a circular face hob type rotary cutter carrying a plurality of cutter blades mounted in groups, is utilized, and a workpiece (gear blank) and the cutter continuously rotate in a timed relationship until the entire part is completed. During the cutting process, the workpiece indexes in a rotary manner so that each successive cutter blade groups engaging successive tooth slots as the gear or pinion member is being cut. Advantageously, the face hobbing method produces uniform depth teeth, and parts are produced from the solid in one operation. The face hobbing method also requires fewer production steps and less production time than the face milling method.

Normally, in an operation separate from, and preceding to, the tooth cutting operation, a topland surface of the gear is machined while processing a ring gear or pinion gear blank before cutting the gear teeth. As well known to those skilled in the art, the additional production step is generally disadvantageous with regard to cost, labor, quality control, and manufacturing flexibility.

SUMMARY OF THE INVENTION

The present invention relates to a gear cutter blade for use with a face hob type cutter for producing teeth of spiral bevel and hypoid gear members by a continuous index, face hobbing process. The gear cutter blade comprises a cutter blade shank adapted to be mounted on a rotatable cutter body, and a cutting member provided at one end of the blade shank. The cutting member includes a tooth side cutting edge having a given axial pressure angle, and a topland cutting edge adjacent the tooth side cutting edge. The topland cutting edge of the cutting member simultaneously forms a topland surface of the tooth of the gear member as a tooth side surface is cut by the tooth side cutting edge of the cutting member.

Machining the topland surface simultaneously with the cutting the tooth side surface permits to reduce or completely eliminate the need to finish topland surfaces of the ring gears or pinions. Moreover, the elimination of a subsequent manufacturing operation improves the consistency and accuracy of the gear tooth whole depth, and part quality, as well as reduces manufacturing costs. In addition, the gear cutter blade of the present invention allows for greater manufacturing flexibility, as the cutting edge dimensions can be easily modified, and provides an ability to machine near-net forged parts without requiring precision control of the topland area of machining with an interrupted cut during a blanking operation.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
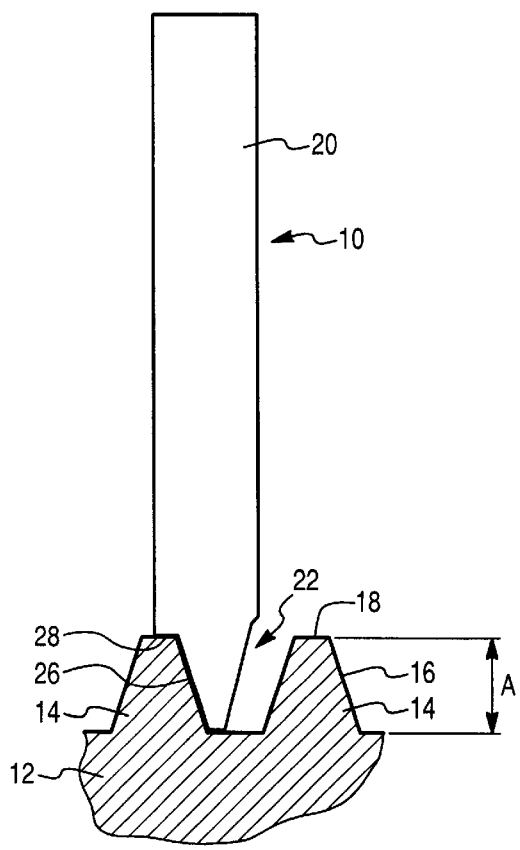
FIG. 1 is a plan view of a front face of a gear cutter blade in accordance with the preferred embodiment of the present invention and a portion of a gear member on which the cutter blade is operating.
Figure 3:
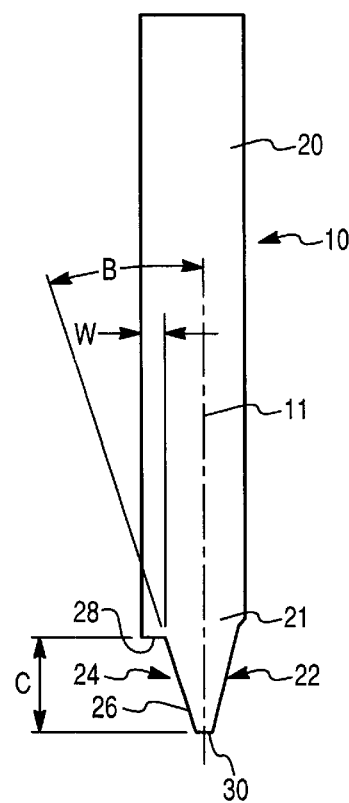
FIG. 3 is a view of the cutter blade of FIG. 1 illustrating geometry of a cutting edge thereof in accordance with the present invention.

Referring to FIGS. 1 and 3, the reference numeral 10 represents a gear-cutting blade in accordance with the present invention and the reference numeral 12 depicts a portion of a ring gear member 12 having a plurality of gear teeth 14 on which the gear cutting blade 10 is operating during a face hobbing process. Each gear tooth 14 includes opposite side surfaces 16 and a topland surface 18. The reference numeral A represents a whole depth of the gear teeth 14. The gear member 12 is also illustrated separately in detail in FIG. 2.

Figure 4:
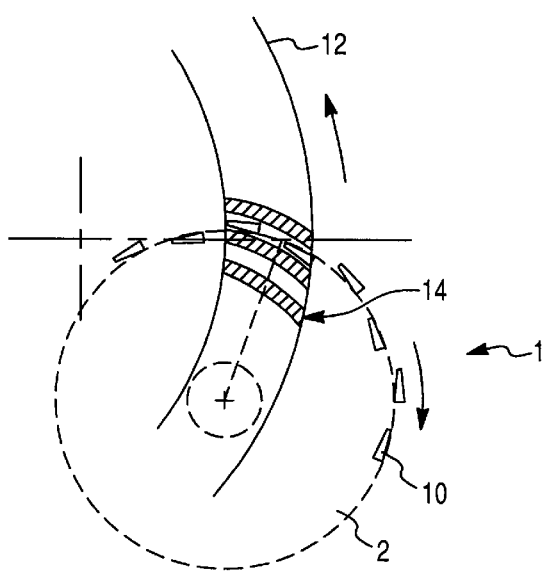
FIG. 4 illustrates the arrangement of a workpiece (a ring gear) and a cutter in a face hobbing process used in the present invention.
Figure 5:
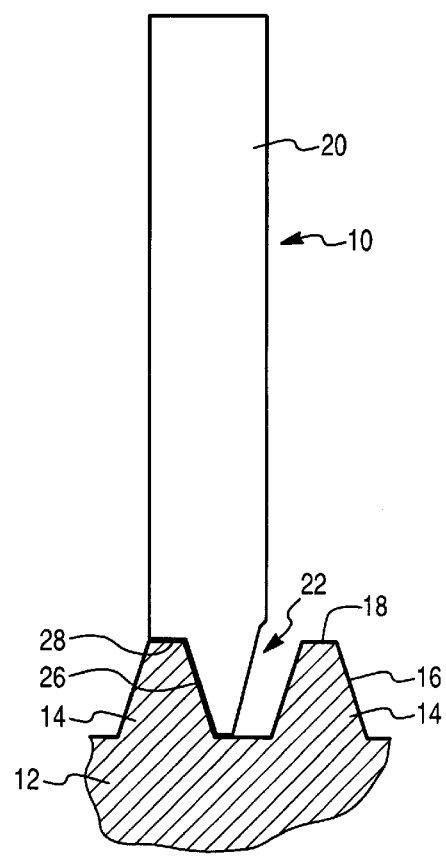
FIG. 5 is a plan view of the front face of the gear cutter blade in accordance with the alternative embodiment of the present invention dimensioned to cut an entire topland surface of a gear tooth of the gear member.

A plurality of the cutter blades 10 is mounted at a selected radius and depth on a rotatable, circular cutter head 2 of a gear cutter assembly 1 as part of a face hobbing cutter system, as illustrated in FIG. 4. Examples of such systems include Tri-Ac®, Pentac®, and Spiron®. During a face hobbing process, the gear member 12 (workpiece), mounted to a workpiece holder (not shown), and the cutter head 2 continuously rotate, with successive cutter blades 10 engaging successive tooth slots as the gear member 12 being cut. FIG. 4 also shows the face hobbing process and the relative interaction of the gear member 12 (workpiece), in this case the ring gear, as the gear teeth 14 are successfully cut by the cutter blades 10 mounted on the cutter head 2. The gear member 12 and the cutter head 2 each rotate in the direction of the arrows indicated.

The cutter blades 10 are generally mounted on the cutter head 2 of the gear cutter assembly in groups. For instance, in the systems offered by The Gleason Works, the cutter blades are arranged on the cutter head in groups of two, each cutter blade pair operating on a different tooth space. In other systems, the cutter blades may be arranged on the cutter head in groups of three. In such systems, there is an inner, outer and rougher blade, which operate to cut the sides and bottom of each tooth space, respectively. The rougher cutter blade is generally provided with both inner and outer cutting edges. The cutter blade 10 illustrated in the drawings is one of the side cutting blades suitable for use with either a two blade or a three blade group.

Figure 2:
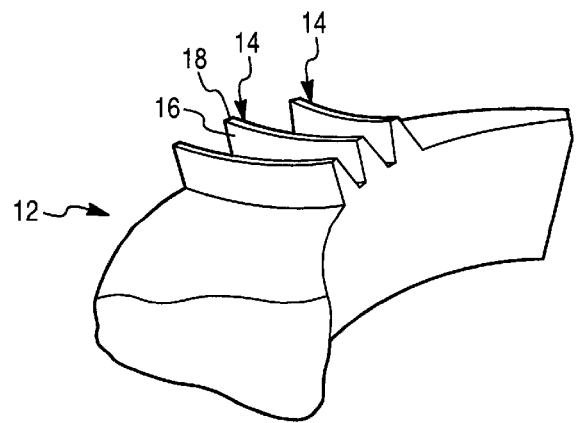
FIG. 2 is a partial perspective view of a ring gear.

While the ring gear member 12 is illustrated in FIGS. 1 and 2, the gear cutter blade of the present invention is equally applicable to the face hobbing of the pinion member of a gear set.

The face hobbing cutting systems generally utilize cutter blades, which are profile ground at the end user's facility from uniform blanks to afford a variety of specified configurations. As illustrated in FIGS. 1 and 3, the cutter blade 10 includes a shank 20 and a cutting member 22 formed at a distal end 21 thereof. A front face of the cutting member 22 of each cutter blade 10 is provided, generally only on one side thereof, with a cutting edge 24. The cutting edge 24 comprises a first section 26 for cutting the side surface 16 of the gear teeth 14, and a second section 28 for cutting the top surface 18 of the gear teeth 14. Thus, the first section 26 defines a tooth side cutting edge and the second section 28 defines a tooth topland cutting edge.

The first section 26 of the cutting edge 24 extends from a tip 30 of the cutting member 22 at a predetermined axial pressure angle B. The axial pressure angle B of the first section 26 of the cutting edge 24 obviously depends on the angle desired for the sides of the gear teeth. As used herein, "axial pressure angle" is defined as the angle between the first section 26 of the cutting edge 24 (or tooth profile) and a central axis 11 of the cutter blade 10.

The second section 28 of the cutting edge 24 is a substantially straight line perpendicular to the central axis 11 of the cutter blade 10, and is characterized by a width W, as illustrated in FIG. 3.

A distance C from the tip 30 of the cutting member 22 to an intersection of the first section 26 and the second section 28 of the cutting edge 24 is a height of the first section 26 of the cutting edge 24 of the cutting member 22. The distance C is substantially equal to the whole depth A of the gear teeth 14.

By modifying the specified blade grinding parameters for forming the cutter blade 10 from a blank, configuration of the cutting edge 24 can be altered to incorporate the second section 28.

Thus, the gear cutter blade 10 of the present invention cuts the side surface 16 of the gear tooth 14 by means of the first section 26 of the cutting edge 24, and simultaneously forms a substantial portion of the topland surface 18 of the gear tooth 14 by means of the second section 28 of the cutting edge 24. Alternatively, the second section 28 of the cutting edge 24 is dimensioned to cut an entire topland surface 18 of the gear tooth 14, as illustrated in FIG. 6.

The cutter blades 10 of the present invention are secured to the circular cutter head 2 in the conventional manner, and the face hobbing system is operated in the same manner as if conventional cutter blades were employed. However, during a face hobbing process of the present invention, as cutter head 2 continuously rotates, the successive cutter blades 10 cut the side surfaces 16 of the gear teeth 14 by means of the first section 26 of the cutting edge 24, and simultaneously machines at least a substantial portion of the topland surface 18 of the gear tooth 14 by means of the second section 28 of the cutting edge 24.

Therefore, with the gear cutter blade 10 of the present invention, the topland surface is machined on the teeth of a gear or pinion member simultaneously with the tooth side cutting operation. This permits to reduce or completely eliminate the need to finish topland surfaces of the ring gears or pinions. Moreover, the elimination of a subsequent manufacturing operation improves the consistency and accuracy of the gear tooth whole depth, and part quality, as well as reduces manufacturing costs. In addition, the gear cutter blade of the present invention allows for greater manufacturing flexibility, as the cutting edge dimensions can be easily modified, and provides an ability to machine near-net forged parts without requiring precision control of the topland area of machining with an interrupted cut during a blanking operation.

As an example of a working embodiment of the gear cutter blade of the present invention, gear cutting tools having the following characteristics have been designed:

Material: High Speed Steel or Carbide;
Axial Pressure Angle B: 5° to 35°;
Distance C: 0.150" to over 1.000";
Width W: 0.030" to 0.200".

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A circular face hob cutter for cutting a gear member having a plurality of gear teeth each having a pair of opposite side surfaces and a topland surface, said circular face hob cutter comprising:

a circular face hob cutter head carrying a plurality of gear cutter blades, each having a central axis, for producing said gear member with uniform depth teeth, each said gear cutter blade comprising:
a shank; and
a cutting member formed at a distal end of said shank;
said cutting member having a cutting edge including a first section extending from said distal end of said shank at a given axial pressure angle and dimensioned to cut at least one of said side surfaces of one of said gear teeth of said gear member, and a second section substantially perpendicular to said central axis of said cutter blade and dimensioned to cut at least a substantial portion of said topland surface of said one gear tooth.

2. The circular face hob cutter as defined in claim 1, wherein said second section of said cutting edge is substantially straight.

3. The circular face hob cutter as defined in claim 1, wherein an axial distance from a tip of said cutting member to an intersection of said first section of said cutting edge and said second section of said cutting edge is substantially equal to the whole depth of said gear teeth.

4. The circular face hob cutter as defined in claim 1, wherein said second section is provided for cutting said entire topland surface of said gear tooth.

5. A circular face hob cutter for cutting a gear member having a plurality of gear teeth each having a pair of opposite side surfaces and a topland surface, said circular face hob cutter comprising:

a circular face hob cutter head carrying a plurality of gear cutter blades for producing said gear member with uniform depth teeth by a continuous face hobbing process, each said gear cutter blade comprising:
a shank;
a central axis; and
a cutting member formed at a distal end of said shank;

said cutting member having a tip and a cutting edge including a first section dimensioned to cut at least one of said side surfaces of one of said gear teeth, and a second section adjacent to said first section and dimensioned to cut at least a substantial portion of a topland surface of said one gear tooth;

said first section of said cutting edge extends from said distal end of said shank at a given axial pressure angle;

said second section of said cutting edge is substantially straight and extends substantially perpendicularly to said central axis of said cutter blade;

wherein an axial distance from said tip of said cutting member to an intersection of said first section of said cutting edge and said second section of said cutting edge is substantially equal to the whole depth of said gear teeth.

6. A method for producing a gear member by a continuous index face hobbing process, said gear member having a plurality of teeth each having opposite side surfaces and a topland surface, said method comprising the steps of:

rotating a circular face hob cutter head carrying a plurality of gear cutter blades;

rotating said gear member in a timed relationship with said cutter head; and providing a relative feed motion of said cutter head and said gear member so that successive gear cutter blades engage successive tooth slots as said gear member is being cut, wherein each of said gear cutter blades has a central axis and includes a cutting member having a cutting edge including a first section extending from said distal end of said shank at a given axial pressure angle and dimensioned to cut at least one of said side surfaces of one of said gear teeth of said gear member, and a second section substantially perpendicular to the central axis of said cutter blade and dimensioned to cut at least a substantial portion of said topland surface of said one gear tooth so that said second section simultaneously forms at least a substantial portion of said topland surface of said one tooth of said gear member as said one tooth is cut by said first section of said cutting edge of said cutting member.

7. The method for producing a gear member as defined in claim 6, wherein said topland surface is formed substantially straight.

8. The method for producing a gear member as defined in claim 6, wherein said second section is provided for cutting said entire topland surface of said gear tooth.

* * * * *